United States Patent [19]

Tiesler

[11] Patent Number: 4,850,139
[45] Date of Patent: Jul. 25, 1989

[54] FLUSH GLASS SLIDING WINDOW

[75] Inventor: Roy F. Tiesler, Troy, Mich.

[73] Assignee: General Motors Corporation, Detroit, Mich.

[21] Appl. No.: 150,973

[22] Filed: Feb. 1, 1988

[51] Int. Cl.⁴ .............................................. E05D 15/10
[52] U.S. Cl. ........................................ 49/130; 49/213; 296/155; 296/201
[58] Field of Search .................... 49/127–130, 49/209, 211, 213, 214; 52/207; 296/155, 201

[56] References Cited

U.S. PATENT DOCUMENTS

| | | |
|---|---|---|
| 2,820,992 | 1/1958 | Clayton-Wright . |
| 2,889,590 | 6/1959 | Kunkel ................................. 49/130 |
| 3,947,998 | 4/1976 | Matsubara ............................ 49/209 |
| 4,489,965 | 12/1984 | Taylor ............................... 49/449 X |
| 4,561,224 | 12/1985 | Jelens ................................ 49/130 X |
| 4,570,381 | 2/1986 | Sterner, Jr. ........................ 49/130 X |
| 4,662,108 | 5/1987 | Romero et al. ....................... 49/130 |

Primary Examiner—James R. Brittain
Attorney, Agent, or Firm—William A. Schuetz

[57] ABSTRACT

A window assembly for a vehicle has a frame for connection with vehicle body structure, a fixed window in the frame which is substantially flush with the frame at its exterior, a sliding window moveable between open and closed positions and releasable locks for locking the sliding window in its closed position. The sliding window when moved to its open position is parallel to and behind the fixed window and when moved forward its closed position is also automatically cammed and moved outwardly so as to lie in the same plane and be flush with the fixed window.

6 Claims, 3 Drawing Sheets

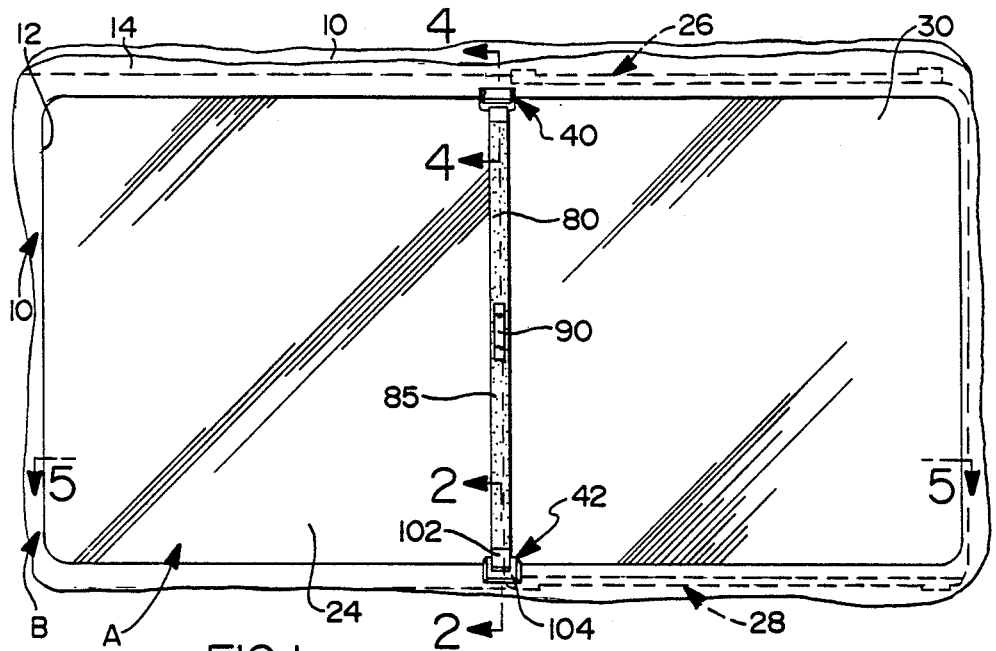
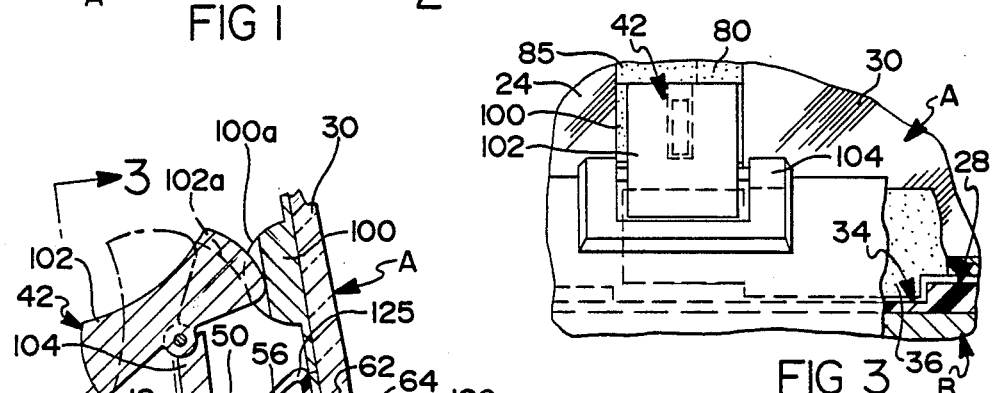
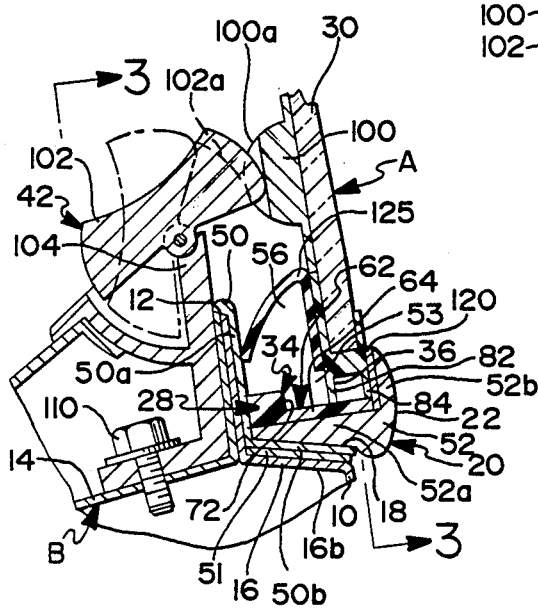
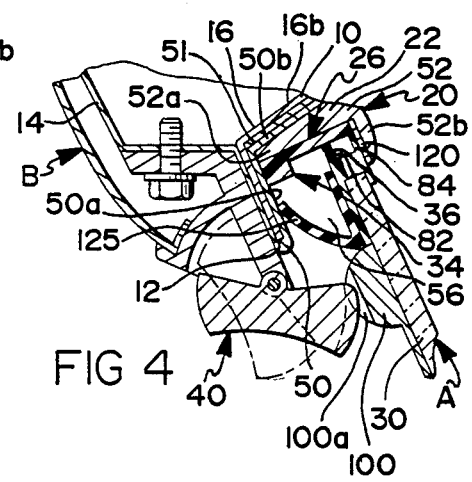
FIG 1
FIG 2
FIG 3
FIG 4

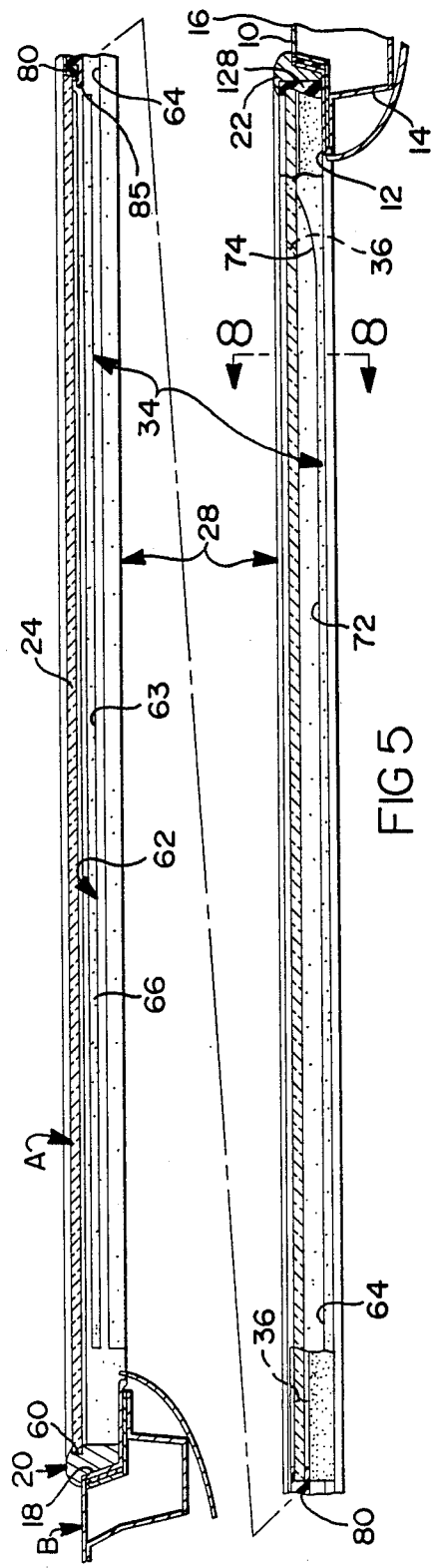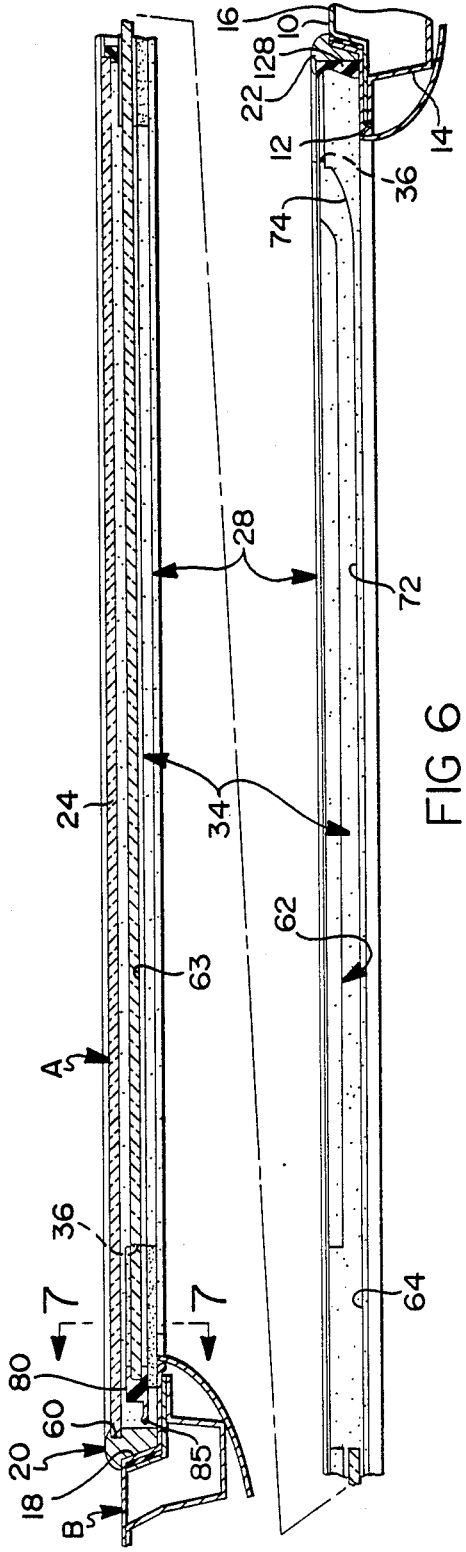

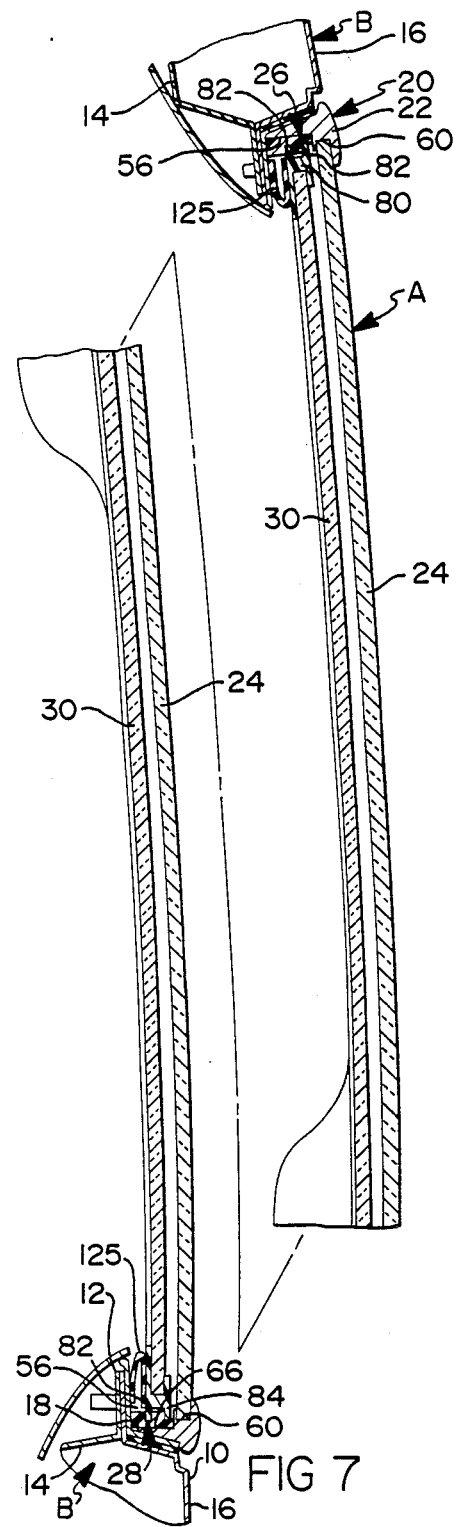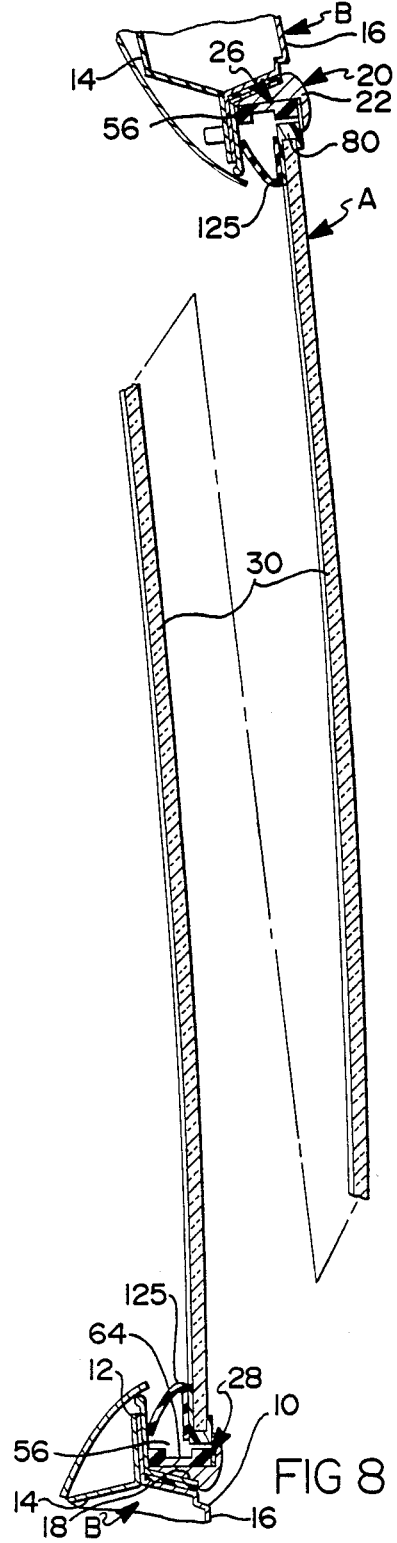

FLUSH GLASS SLIDING WINDOW

The present invention relates to a sliding window assembly, and more particularly to a sliding window assembly for an automotive vehicle and which has a fixed window and a sliding window which is flush with the fixed window and the vehicle at its exterior side when in its closed position.

Heretofore, various sliding window assemblies have been provided for use in vehicles, such as buses, vans, etc., which include both a fixed window and a sliding window movable between an open and a closed position in a path parallel to the plane of the fixed window. An example of such an arrangement is shown in U.S. Pat. Ser. No. 2,820,992, and assigned to the same assignee as the present invention. While these known prior window assemblies have been satisfactory in use, they have the drawback in that both windows, when the sliding window thereof is in its closed position, do not lie flush or substantially flush with the exterior surface of the vehicle.

Accordingly, it is a broad object of the present invention to provide a new and improved window assembly for use in an automotive vehicle, such as a bus, van, etc., and which includes both a fixed window and a sliding window slidably movable between an open position and a closed position, and in which the sliding window, when moved to its closed position, is flush with the fixed window and flush or substantially flush with the exterior surface of the vehicle.

Another object of the present invention is to provide a new and improved window assembly, as defined in the next preceding object, and in which the window assembly is of a relatively inexpensive and simple construction, can be pre-assembled as a subassembly and can be readily attached to the vehicle.

A further object of the present invention is to provide a new and improved window assembly, as defined in the preceding objects, and in which the window assembly includes a frame means which is adapted to be secured to body structure of the vehicle defining a window opening and which has an outer reveal surface which is substantially flush with the vehicle body structure at its exterior side, a fixed window supported by the frame means and with its exterior surface lying substantially flush with the reveal surface, a pair of spaced guide tracks carried by the frame means along opposite sides thereof for slidably supporting a slidable window between closed and open positions, and in which the sliding window and the guide tracks have guide means which are cooperatively engageable and which function to allow the sliding window at its side adjacent the fixed window, when in its closed position, to be moved inwardly and then slid along the guide tracks to position the slidable window in its open position behind the fixed window and, when the slidable window is moved back toward its closed position, to automatically cause the sliding window to be cammed outwardly as it approaches its closed position so that it will be positioned flush with the fixed window and be substantially flush with the outer reveal surface of the frame means.

Yet another object of the present invention is to provide a new and improved window assembly, as defined in the next preceding object, and in which the guide means on the guide tracks include a rail extending parallel to the fixed window at a location behind thereof and an outwardly curved cam surface adjacent the end of the frame remote from the fixed window so that when the slidable window is slid along the guide rail towards its closed position it will engage the cam surface and automatically be cammed outwardly against the frame so as to be flush with the fixed window.

A still further object of the present invention is to provide a new and improved window assembly, as defined in the next preceding object, and in which the window assembly includes seal means for sealing the sliding window when the latter is in its closed position and manually releasable locking means for locking the sliding window in its closed position so as to prevent it from being moved toward its open position.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification, and in which similar reference numerals are applied to designate corresponding parts throughout the several views, and in which:

FIG. 1 is a partial side elevational view of an automotive vehicle embodying the novel window assembly of the pres invention and looking outwardly from the interior of the vehicle;

FIG. 2 is an enlarged fragmentary cross-sectional view taken along the lines 2—2 of FIG. 1;

FIG. 3 is a fragmentary sectional view of part of the window assembly shown in FIG. 1 and taken along the lines 3—3 of FIG. 2;

FIG. 4 is an enlarged fragmentary cross-sectional view of part of the window assembly shown in FIG. 1 and taken along the lines 4—4 of FIG. 1;

FIG. 5 is an enlarged cross-sectional view of the window assembly shown in FIG. 1 and taken along the lines 5—5 of FIG. 1;

FIG. 6 is a view like that shown in FIG. 5, but showing different parts thereof in different positions;

FIG. 7 is an enlarged cross-sectional view of the window assembly shown in FIG. 6 and looking in the direction of the arrows 7—7 thereon; and FIG. 8 is a view similar to that shown in FIG. 7, but showing different parts thereof in different positions.

Referring to FIG. 1 in the drawings, a novel window assembly A embodying the present invention is there shown for use in an automotive vehicle B. Although the novel sliding window assembly A could be used in an application wherein it is desirable to have a sliding window, it is especially useful in automotive vehicles, such as buses, trucks, cabs, vans, etc.

As best shown in FIGS. 1 and 5 through 8, the vehicle B includes side body structure 10 which defines a window opening 12. The side body structure 10 is shown as comprising inner and outer body panels 14 and 16 which are suitably secured together, such as by welding. The outer body panel 16 is stepped, as viewed in cross section in FIG. 7, and defines a rectangular recess 18 surrounding the window opening 12 for receiving the window assembly A.

The sliding window assembly A comprises, in general, a rectangularly shaped frame means 20 which is supported by the body structure 10 and which has an outer reveal surface 22 which is substantially flush with the outer panel 16 of the vehicle body structure 10, a fixed window 24 supported by the frame means 20 so that its exterior surface is flush or substantially flush with the reveal surface 22, guide tracks 26 and 28, respectively, carried by the frame means 20 along its upper and lower sides for slidably supporting and guiding a slidable window 30 for movement between a closed position as shown in FIGS. 1 and 5, in which it along with the fixed window 24 closes the window opening 12 and an open position, as shown in FIG. 6, in which it is disposed behind the fixed window 24 to partially open the window opening 12, guide means 34 and 36 on the guide tracks 26 and 28 and on the sliding window 30, respectively, which are cooperably engageable and function to allow the sliding window 30 at its side adjacent the fixed window 24, when in its closed position, to be moved inwardly and then slid along the guide tracks 26 and 28 to position the same behind the fixed window 24 when moved to its open position, and which causes the sliding window 30, when moved back towards its closed position, to be automatically cammed outwardly as it approaches its closed position so that it will be positioned in the same plane as the fixed window 24 to be flush therewith and substantially flush with the reveal surface 22, and upper and lower releasable locking means 40 and 42 for locking the sliding window 30 in place in its closed position.

The frame means 20 comprises an inner frame 50 and an outer frame 52, preferably made from a metal material, such as brass. The inner frame 50 is generally L-shaped, as viewed in cross section in FIG. 2, and is wholly disposed in the recess 18 defined by the body structure 10. The inner frame 50 has its inner leg 50a in abutting engagement with back-to-back flanges formed on the inner and outer body panels 14 and 16 and which define the window opening 12. The inner frame 50 has its lower or outer leg 50b in abutting engagement with a flange 16b formed on the outer panel 16. A suitable planar seal 51 is disposed between the inner leg 50b and the outer body structure 16 to provide a seal therebetween. The outer frame 52 has an inner portion 52a in abutting engagement with the outer leg 50b of the inner frame 50 and an outer portion 52b which is convex, as viewed in cross section as shown in FIG. 2, and which defines the outer reveal surface 22. The inner and outer frames 50 and 52 are suitably secured together and to the body structure 10 of the vehicle by any suitable means, such as by fasteners. In addition, the inner and outer frames 50 and 52 along their upper and lower sides, as best shown in FIGS. 2, 7 or 8, define horizontally disposed recesses or channels 56 for receiving the guide tracks 26 and 28.

The fixed window 24 is fixed to the outer frame 52. The fixed window 24 is generally rectangular or square in shape and has its upper, lower and left-side peripheral edges, as viewed in FIG. 5, received within a recess 60 formed in the outer frame 52 and is suitably bonded or adhesively secured to the outer frame 52.

The guide tracks 26 and 28 are of identical construction and hence only the lower guide track, as viewed in FIGS. 2 and 7, will be described in detail. The guide track 28 comprises a one-piece molded plastic member which is disposed within the channel 56 and extends throughout the length of the window assembly A along its bottom side. The guide track 28 defines a slot 62 having a narrow width portion 63 extending along the longitudinal extent of the fixed window 24 at a location interiorally thereof and a wider width portion 64 extending along the sliding window 30 throughout its longitudinal extent. Extending upwardly from the bottom of the narrow width portion 63 of the slot 62 intermediate its inner and outer sides is a linearly extending guide rail 66. The guide track 28 is preferably made from a plastic material, such as nylon, and is suitably secured to the outer frame 52 along its inner portion 52a. The upraised guide rail 66 terminates adjacent the right side of the fixed window, as viewed in FIGS. 1 and 5.

The wider width portion 64 of the slot 62 extends linearly along the sliding window 30 and enables the sliding window 30 to be moved from its closed position in which it is flush with the fixed window 24 to a position located wholly behind the fixed window 24. The slot 62 is defined by a linearly extending inner wall or surface 72 of the guide track 28 and the outer portion 52b of the outer frame 52. The inner wall or surface 72 of the guide track 28 includes an outwardly curved portion at its end remote from the fixed window 24 which defines a cam surface 74, as best shown in FIGS. 5 and 6. The slot 62, wall surface 72, cam surface 74 and the guide rail 66 comprise the guide means 34.

The guide tracks 26 and 28 slidably support and guide the movement of the sliding window 30 between its open and closed positions. The sliding window 30, as best shown in FIGS. 1, 6 and 7, comprises a generally square or rectangularly shaped window whose outer and left side peripheral edges are surrounded by a plastic trim molding 80. The trim molding 80 at spaced horizontal locations along its top and bottom sides is integrally formed with the guides 36. The guides 36 at the top side of the sliding window 30 extend upwardly of the window 30 and along the bottom side extend below the window 30. The guides 36 are generally H or U-shaped to define a pair of space legs 82 and 84 and with the guides 34 at the bottom of the window 30 slidably engaging the bottom surface of the guide tracks 28. The guides 36 also are adapted to straddle the guide rails 66 of the guide tracks 26 and 28 and rightmost guides 36, as viewed in FIGS. 1 and 6, are adapted to engage the cam surfaces 74 of the guide tracks 36 and 28. The trim molding 80, along the left side of the sliding window, is shaped to have an inner leg or flange 85 coplanar with the window 30 and which overlies the right side of the fixed window 24 when the sliding window 30 is in its closed position (see FIGS. 5 and 6). In addition, a suitable manual handle 90 formed integral with the trim molding 80 at its interior left side is provided for manual manipulation of the sliding window 30.

The sliding window 30 is adapted to be locked in its closed position, as shown in FIG. 1, by the locking means 40 and 42. The locking means 40 and 42 are of an identical construction and hence only the lower locking means 42 will be described in detail. The locking means 42 comprises an inwardly extending locking tab 100 formed integral with the trim molding 80 along the left interior side of the window 30 adjacent its lower corner. The locking means 42 further includes a pivotable locking member 102. The locking member 102 is pivotally supported by a support housing or means 104, the support housing 104 in turn being rigidly secured to the inner panel 14 of the vehicle body structure via fasteners 110.

The locking member 102 can be manually pivoted between a locking position, as shown by the solid lines in FIG. 2, in which it engages the locking tab 100 to prevent the sliding window 30 from being moved from its closed position, and an unlocked position, as shown by the phantom lines in FIG. 2, in which the pivotal member 102 thereof is disposed out of the way to enable the sliding window 30 to be moved inwardly within the guide track 28 and 26 and thereafter moved or slid toward its open position. Preferably, the pivotal member 102 is snap fittingly moved between its positions and in a conventional manner. The locking tab 100 has a narrow width portion 100a at its end remote from the window 30 which is slidably received within a recess 102a formed within the pivotal member 102 so that the latter straddles the locking tab 100.

The operation of the sliding window assembly A will now be described. When the sliding window 30 is in its closed position and locked in place, it has the position shown in FIG. 1, as viewed from the interior of the vehicle. In this position, the trim molding 80 at the outer side of the sliding window, along its top and bottom, engages a seal 120 carried by the outer portion 52b of the outer frame 52 to provide a seal therebetween. Also, the flange 85 of the trim molding 80, along the left side of the sliding window 30, carries a seal 121 which engages the right side edge of the fixed window 24 and the right side of the sliding window 30 along and adjacent its side edge engages a vertically extending seal 128 carried by the outer frame 52, the seal 128 being progressively tapered outwardly proceeding from its inner side toward its outer side to provide a seal therebetween along the right side of the sliding window. In addition, the sliding window 30 along its sides, top and bottom adjacent its outer periphery carries a deflectable seal means 125 which engages the inner flange 50a of the inner frame 50 to provide a seal therebetween.

When it is desired to slide the window 30 from its closed position, as shown in FIGS. 1, 2, 5 and 8, the operator will merely move the locking members 102 on the locking means 40 and 42 from their locked position, as shown by the solid lines in FIGS. 2 and 4, toward their unlocked position, as shown by the phantom lines in FIGS. 2 and 4. When the locking members 102 of the locking means 40 and 42 have been moved to their unlocked or released position, the operator can grab the handle 90 and move the sliding window 30 inwardly. This movement is permitted since the wider width portion 64 of slot 62 is such as to allow the left end of the window 30 to be moved inwardly until the guides 36 at the left side of the window 30 engage the wall 72 of the guide tracks 26 and 28. In this position, the leftmost guides 36 will be disposed behind the fixed window 24. During this inward movement, the guides 36 at the right side of the sliding window 30 will merely pivot in the slot 62 to allow the inward movement at the left side of the window 30. The window 30 can then be slid to the left, as viewed in FIG. 1, to enable the same to be moved from its closed position to its open position. As the window 30 is slid to the left, the guides 36 adjacent the left end of the window 30 will straddle the guide rails 66 on the guide tracks 26 and 28 so as to guide the movement of the window 30 as it is moved leftward. As the window 30 approaches its fully open position, in which it is wholly disposed behind the fixed window 24, the rightmost guides 36 carried by the window 30 will also straddle and be slidably guided on the guide rail 66. This guide arrangement not only enables the window to be guided between open and closed positions but also retains the same in place within the guide tracks 26 and 28. The opening movement of the window 30 will also cause the seal means 125 to be deflected inwardly while maintaining sealing engagement with the inner frame 50.

When it is desired to move the sliding window 30 from its open position toward its closed position, the operator will merely grab the handle 90 and move the same rightward, as viewed in FIG. 1. Movement of the window 30 toward the right will be guided by the guides 36, guide rail 66 and the guide surface 72 defining the guide slot 62. As the window 30 approaches its rightmost or closed position, the rightmost guides 34 thereon will engage the cam surface 74. When this occurs, the cam surface 74 will automatically cam and move the right end of the window 30 outwardly toward a position in which it will be flush with the fixed window 24 and engage the seals 120 on the outer portion 52b of the outer frame 52. When the window is fully moved toward the right, its right side will also engage the seal means 128. When in this position, the left end of the window can then be pushed outwardly and with the seal 121 engaging the right side of the fixed window 24. The seals 125 will merely deflect to remain in sealing engagement with the inner portion 50a of the inner frame 50. When this occurs, the sliding window 30 will be sealed flush with the fixed window 24 and will be substantially flush with the outer reveal surface 22 of the outer frame 52, which, in turn, is substantially flush with the exterior panel 16 of the vehicle. When the sliding window is in its fully closed position, the locking members 102 of the releasable locking means 40 and 42 can be pivotally moved from their phantom line positions as shown in FIGS. 2 nd 4 toward their solid line position and snap fittingly engage the locking tabs 100 to lock the siding window 30 in its closed position and prevent sliding or shifting movement of the window 30.

From the foregoing, it should be apparent that a novel sliding window assembly A has been provided in which the sliding window thereof is normally disposed flush with the fixed window, but which can be readily manipulated and slidably moved so as to be disposed behind the fixed window 24 when it is desired to open the window 30. It should also be apparent that the flushness and sliding movement is achieved with a minimum number of parts and with a simple and economical construction.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A window assembly for use in a vehicle having body structure defining a window opening and which comprises:

(a) a frame means adapted to be secured to said body structure and having an outer peripherally extending reveal surface which is generally flush with the vehicle body structure at its exterior side, (b) a fixed window supported by said frame means so that its exterior surface is generally flush with said reveal surface, (c) a pair of vertically spaced, horizontally disposed guide tracks carried by said frame means along its upper and lower sides for slidably supporting a slidable window for movement between a closed position in which the slidable window along with the fixed window closes said window opening and an open position in which the slidable window is disposed parallel and inwardly behind said fixed window to partially open said window opening, the improvement being that said frame means comprises outer and inner frames which are connected together and define a channel for receiving the upper and lower guide tracks at the opposite horizontal sides of the window, said guide tracks each have an inner surface and a bottom surface, a guide rail extending upwardly from said bottom surface, parallel to and coextensive with said fixed window and located between said inner surface and said fixed window, said inner surface of said guide tracks being curved outwardly to define a cam surface adjacent its end remote from said fixed window, said sliding window having horizontally spaced first and second guides at its upper and lower sides, said sliding window at its side adjacent said fixed window, when in its closed position, being movable inwardly within said guide tracks while its side remote from said fixed glass pivots to position said first guides thereon in alignment with said guide rails, said sliding window then being slidable toward its open position and with said first and second guides on said sliding window having means for straddling said guide rails of said guide tracks to guide the movement of said sliding window through a path of movement parallel to the plane of the fixed window, said cam surfaces on said inner surfaces of said guide tracks being engageable by said second guides and said sliding window when the latter is moved and approaches its closed position and causing said sliding window to be automatically cammed outward against said frame means and positioned in the same plane as said fixed window to be flush therewith and generally flush with said reveal surface.

2. A window assembly, as defined in claim 1, and wherein the first and second guides carried by the sliding window are H-shaped to define a pair of spaced legs extending away from the adjacent edge of the sliding window and which straddle the guide rails to guide the movement of the sliding window.

3. A window assembly, as defined in claim 2, and wherein said first and second guides carried by the sliding window are integral with a peripherally extending trim molding surrounding the edges of said sliding window and wherein said latter trim molding along its exterior side engages a seal means carried by the outer frame to provide a seal therebetween when in its closed position.

4. A window assembly, as defined in claim 3, and wherein said sliding window carries a deflectable seal means along its inner sides for engaging the inner frame means to provide a seal therebetween and for biasingly retaining the sliding window in its closed position against the outer frame means.

5. A window assembly as defined in claim 4, and including cooperably engageable locking means carried by said body structure and the sliding window to releasably lock the latter in its closed position.

6. A window assembly, as defined in claim 1, and including locking means comprising a pivotal latch carried by the body structure of the vehicle and a cooperably engageable locking tab carried by the sliding window to enable the sliding window to be locked against movement when in its closed position.

* * * * *